United States Patent [19]

Ishikawa et al.

[11] Patent Number: 4,831,455
[45] Date of Patent: May 16, 1989

[54] PICTURE READING APPARATUS

[75] Inventors: Tadashi Ishikawa, Urawa; Yoshitaka Watanabe, Tokyo; Yoshiyuki Mizoguchi, Yokohama, all of Japan

[73] Assignee: Canon Kabushiki Kaisha, Tokyo, Japan

[21] Appl. No.: 15,952

[22] Filed: Feb. 18, 1987

[30] Foreign Application Priority Data

Feb. 21, 1986 [JP] Japan .................................. 61-37715
May 14, 1986 [JP] Japan .................................. 61-108486
May 14, 1986 [JP] Japan .................................. 61-108490
Jul. 11, 1986 [JP] Japan .................................. 61-162080
Nov. 14, 1986 [JP] Japan .................................. 61-269825

[51] Int. Cl.$^4$ .......................................... H04N 1/024
[52] U.S. Cl. .................................... 358/229; 354/293; 358/85; 358/257; 358/294; 379/100
[58] Field of Search ................ 358/229, 256, 257, 85, 358/294; 354/293; 379/100

[56] References Cited

U.S. PATENT DOCUMENTS

| | | | |
|---|---|---|---|
| 3,699,252 | 10/1972 | Jackson | 358/229 |
| 4,474,439 | 10/1984 | Brown | 358/229 |
| 4,485,400 | 11/1984 | Lemelson | 358/229 |
| 4,572,594 | 2/1986 | Schwartz | 358/229 |

Primary Examiner—Howard W. Britton
Attorney, Agent, or Firm—Fitzpatrick, Cella, Harper & Scinto

[57] ABSTRACT

A picture reading apparatus is disclosed which comprises a camera which converts a picture to be read to an electric signal, a supporting member for supporting the camera movably, and a voice input unit. A control device serves to minimize the output from the voice input unit during movement of the supporting member. Thus while a mechanism for moving the camera is in operation, the output from the voice input unit is minimized to suppress the output of operational noise.

10 Claims, 10 Drawing Sheets

PICTURE READING APPARATUS

BACKGROUND OF THE INVENTION

1. Field of the Invention

The present invention relates to a picture reading apparatus and more particularly to apparatus for reading a picture using, for example, an electronic camera or the like.

2. Related Background Art

Applicants have proposed and disclosed a picture reading apparatus of this type in Japanese Patent Application No. 176083/1985.

However, in the proposed apparatus, no voice device is included, so that a microphone must be additionally prepared, for example, when voice transmission is required during use of the picture reading apparatus.

SUMMARY OF THE INVENTION

The present invention has been made in view of the above prior art drawback. It is a first object of the present invention to provide integral voice input means in a picture reading apparatus.

In order to achieve this object, a preferred embodiment of this invention includes voice input means disposed in support means of the picture reading apparatus.

Thus if voice transmission is needed during use of the picture reading apparatus, the voice input means is available without the need for additional preparation for a microphone, etc.

It is another object of this invention to provide a picture reading apparatus in which a preferred disposition of voice input means is accomplished.

It is a further object of this invention to provide a picture reading apparatus which can alleviate the influence, on the voice input means, of noise, etc., produced, for example, by the movement of movable members when the picture reading apparatus is operated.

According to a preferred embodiment for achieving these to achieve these objects, there is disclosed a picture reading apparatus comprising a photoelectric conversion means for converting a read picture to an electric signal, support means for movably supporting the photoelectric conversion means, voice input means, and control means for minimizing the output of the voice input means during the movement of the support means.

According to this embodiment, the output of the voice input means is minimized during operation of a movement mechanism for the photoelectric conversion means, so that possible operation noise, which might be annoying to the operator or anyone else present, is prevented from being output.

It is a further object of this invention to provide a picture reading apparatus which includes support means which movably supports photoelectric conversion means which converts a read picture to an electric signal, in which generation of an undesired video signal from the photoelectric conversion means is prevented during the movement of the support means.

In order to achieve such an object, according to a preferred embodiment of this invention, there is disclosed a picture reading apparatus comprising an object plate on which an object to be read can be placed, picture pickup means supported movably on the plate for picking up a picture in the object to output a video signal, a monitor display for outputting the read picture using the video signal, control means for preventing the monitor display from displaying of the video signal output from the pickup means during movement of the pickup means.

In the thus constructed picture reading apparatus, there is provided means, halfway in the circuit of signal lines which carry a video output signal from the pickup means, for interrupting the output signal from the pickup means or for reducing the output signal to below a predetermined level in response to and during movement of the pickup means. Thus an undesirable and useless picture is erased.

It is a further object of this invention to provide a picture reading apparatus which improves certain mechanisms, for example, the layout and mechanism of support means which supports the pickup means, of the apparatus proposed in the above application.

Other objects and features of this invention will be apparent from the following description of preferred embodiments thereof and the accompanying drawings.

DETAILED DESCRIPTION OF THE PREFERRED EMBODIMENT

This invention will now be described o the basis of embodiments thereof.

(First Embodiment)

Figure 1:
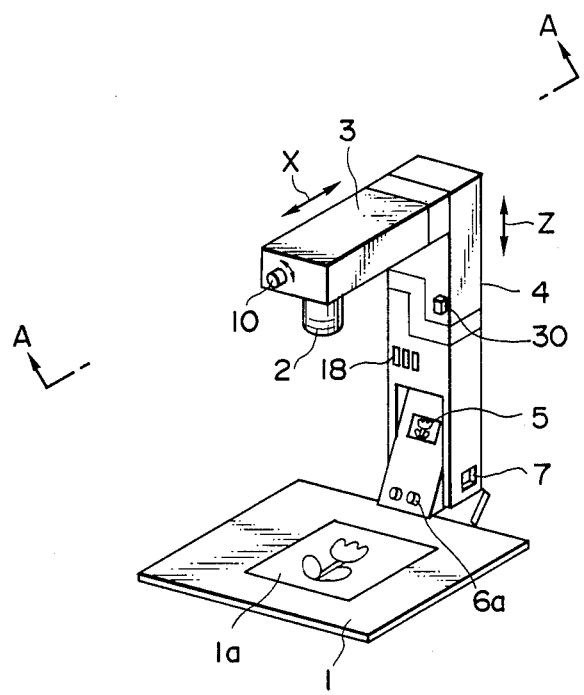
FIG. 1 is a perspective view of one preferred embodiment of a picture reading apparatus according to this invention.
Figure 2:
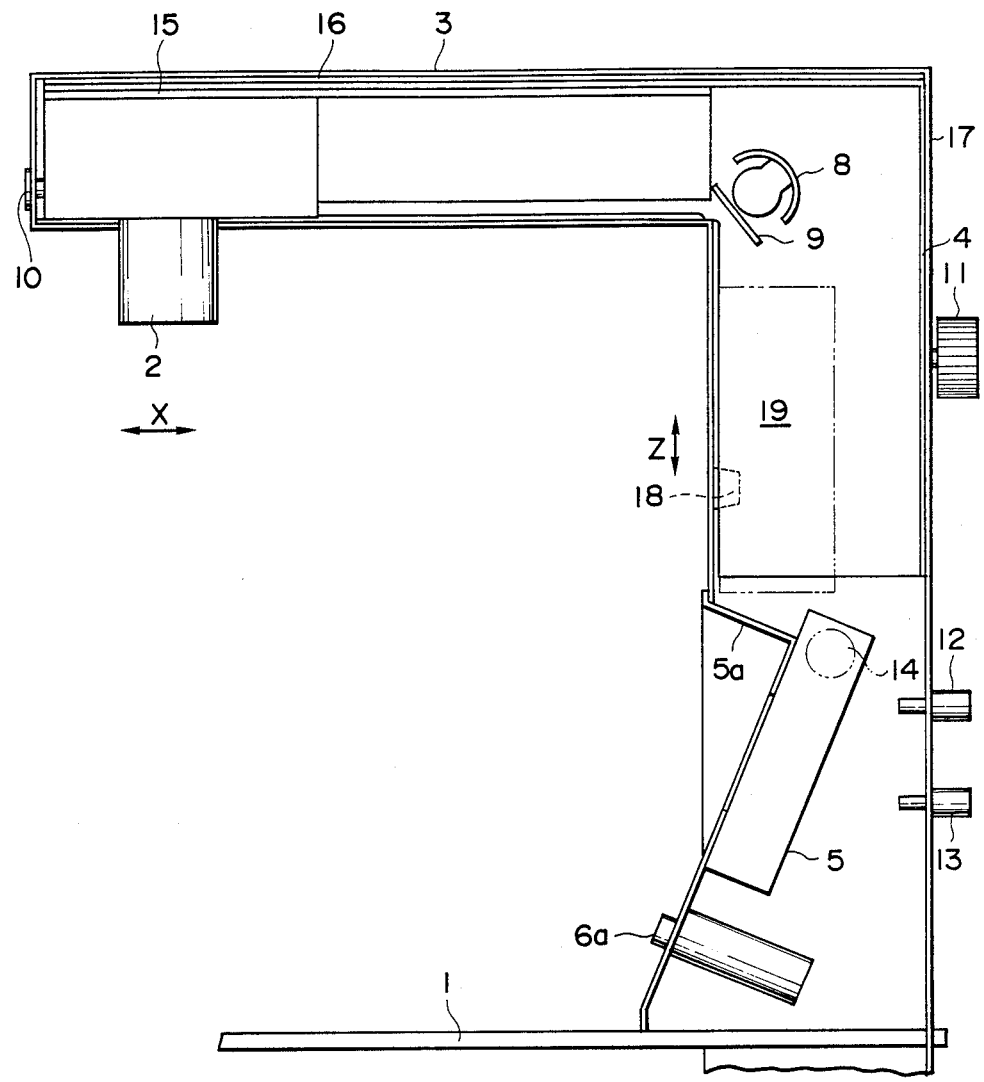
FIG. 2 is a cross-sectional view taken along the line A—A FIG. 1.

FIGS. 1 and 2 are a perspective view of a first embodiment of this invention, and an enlarged cross-sectional view taken along the line A—A of FIG. 1, respectively.

In FIGS. 1 and 2, reference numeral 1 denotes a document or object plate on which a material containing a picture 1a to be read is placed. The camera-side surface of plate 1 is covered with gray color in order to adjust the white balance of a camera 2. The camera 2 includes a photoelectric conversion unit to read a picture in an original document or the like to be described later. The camera-side surface of plate 1 may be white. However, if too much light enters the photoelectric conversion unit, the output of the conversion unit would be saturated so that appropriate adjustment of the white balance may be impossible. Thus in order to prevent this, it is preferable to use gray which has a lower reflection factor than white. In order to prevent random reflective light from entering camera 2 from plate 1, plate 1 is of the diffusion reflection type. Camera 2 is of the electronic type and is firmly secured to a horizontal supporting member 3 to be described later and includes a color photoelectric conversion unit. Horizontal supporting member 3 is slidable in the direction of the arrows X shown so as to shift the area photographed or picked up by camera 2. A vertical supporting member 4 is firmly secured to horizontal supporting member 3 and is slidable in the direction of the arrows Z shown. Vertical supporting member 4 has at its lower plate-side end a monitor display 5, a switch 6a which selects between an external input video signal to be also described later and a video signal from camera 2 to feed to display 5 and an external utilization device, and a power source switch 7. In order that the user, who is near plate 1, can easily see the display 5, monitor display 5 is tilted at the lower portion of vertical supporting member 4. Monitor display 5 is also disposed so that display 5 and plate 1 are at equal distances from the user. The tilting of monitor 5 which includes a liquid crystal television causes monitor 5 to be placed deep within vertical supporting member 4 with a ceiling 5a preventing light from a lamp 8 to be described later from entering display 5, thereby protecting same from becoming obscure. Lamp 8 illuminates the entire plate 1 via a diffusion plate 9. Lamp 8 illuminates plate 1 from above and to one side so as to prevent a light flux from lamp 8 from being reflected and directly entering camera 2. A switch 10 automatically adjust the white balance of camera 2 when switched on. The white balance may be adjusted manually in accordance with the external light, for example, a fluorescent light, daylight or incandescent light when switch 10 is switched on. An operation knob 30 can slide or fix vertical supporting member 4. An external video signal is applied to an external input terminal 12 and output from monitor display 5 and monitor output terminal 13. An illumination lamp 14 illuminates monitor display 5. Reference numerals 15, 16 and 17 denote a slide table to be also described in more detail later, an up-and-down moving stand and a fixed stand which fixes plate 1, respectively. An external voice input unit such as a microphone 18 is built in vertical supporting member 4 and may output its voice output from an output terminal (not shown) or from a monitor output terminal 13.

(Operation)

According to the above structure, when the picture reading apparatus is used and a voice input is required, the built-in microphone 18 is at once available. Since microphone 18 is disposed near a circuit 19, as will be obvious from FIG. 2, advantageously, electric noise is difficult to entrain on the voice signal.

(Second Embodiment)

However, in the first embodiment, the user of the apparatus is remote from microphone 18, so that even a microphone of high directivity would pick up ambient noise and the S/N ratio of the voice signal would be reduced.

Since the previous embodiment includes vertically slidable vertical supporting member 4 and video output switch 6a, etc., microphone 18 may pick up switching noise by switch 6a, frictional noise produced when vertical supporting member 4 is moved vertically, noise produced by rotation and/or fastening of a fixed knob 11 at vertical supporting member 4, etc. Thus an improved embodiment which improves the S/N ratio of the voice output will be shown in FIGS. 3 and 4. In this embodiment, the external voice input unit is disposed at an end of a horizontal portion of the supporting member nearest the user of the apparatus.

Figure 3:
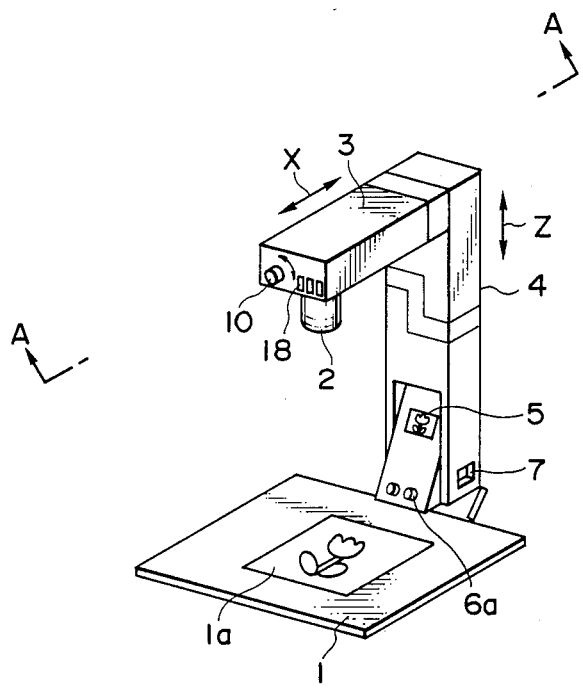
FIGS. 3 and 4 are views of a second embodiment of the present invention and are similar to FIGS. 1 and 2, respectively.
Figure 4:
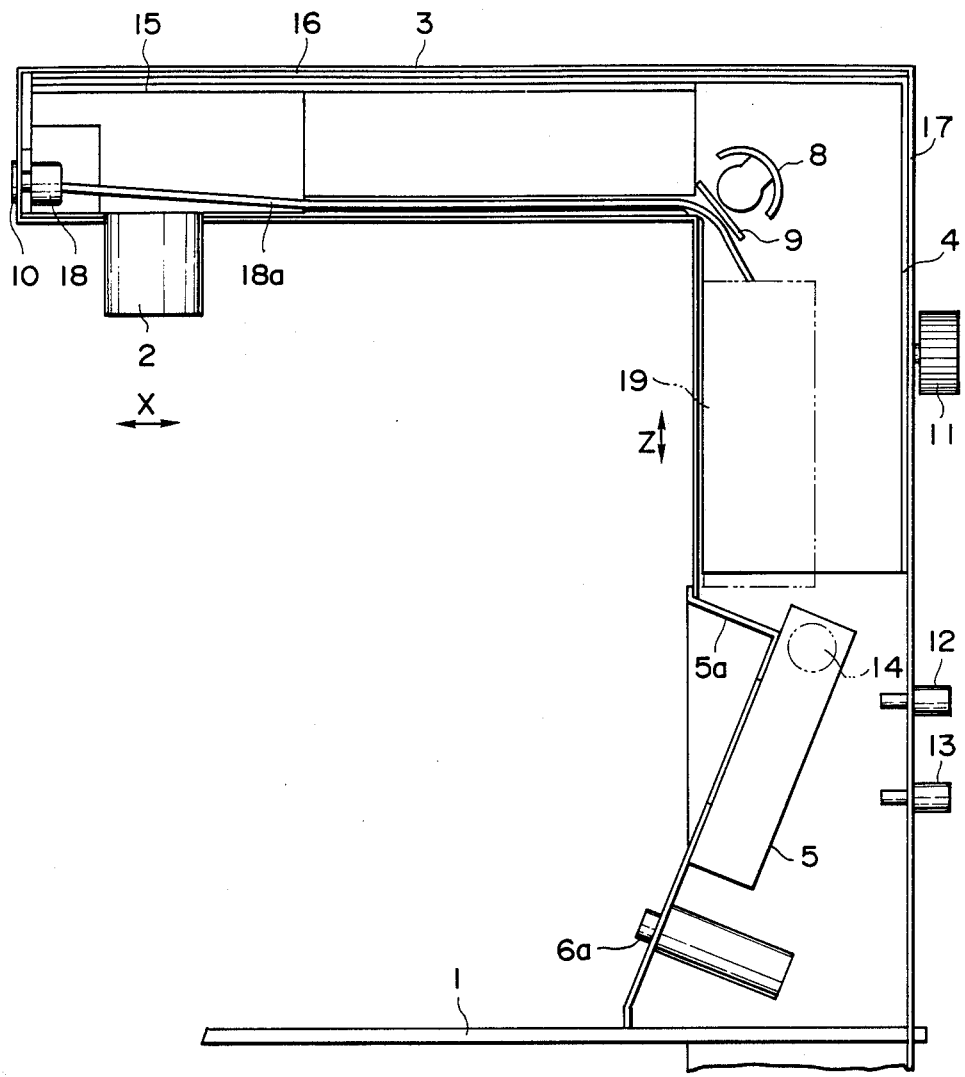

FIGS. 3 and 4 are a perspective view of the second embodiment and an enlarged cross-sectional view taken along the line A—A of FIG. 3, respectively. Like components in FIGS. 1 and 2 and FIGS. 3, 4 are identified by like numerals and a duplicate description will not be repeated.

(Structure)

This embodiment is characterized that, as described above, the external voice input unit such as microphone 18 is disposed at an end of horizontal supporting member 3 of the camera support unit, the voice signal is transmitted via shield line 18a to circuitry 19 to process signals, and a shield line 18a is used as a lead so as not to pick up electric noise.

(Operation)

According to the above structure, microphone 18 is disposed nearest the user of the apparatus, so that use of a microphone having high directivity prevents the microphone from picking up useless ambient noise and can pick up tee user's voice with fidelity. Microphone 18 is disposed remote from sources of noise such as switching noise by switch 6a, noise produced by sliding vertical supporting member 4, and noise produced by rotation/fastening of knob 11, so that the microphone is prevented from picking up these noises, thereby improving the S/N ratio of the voice output signal.

As described above, according to this embodiment, the external voice input unit is built in the supporting member of the picture reading apparatus, so that when the apparatus is used, the voice input unit can at once meet the need for voice input, if any.

(Third Embodiment)

Now a third embodiment of this invention will be described which prevents noise produced by operations such as locking, unlocking or the like from adversely affecting the output of the microphone during movement of the photoelectric conversion unit. The external appearance of this embodiment are the same as in the perspective view of FIG. 1, so that a duplicate description will not be repeated and only a description concerning the cross-section of the embodiment will be made.

Figure 5:
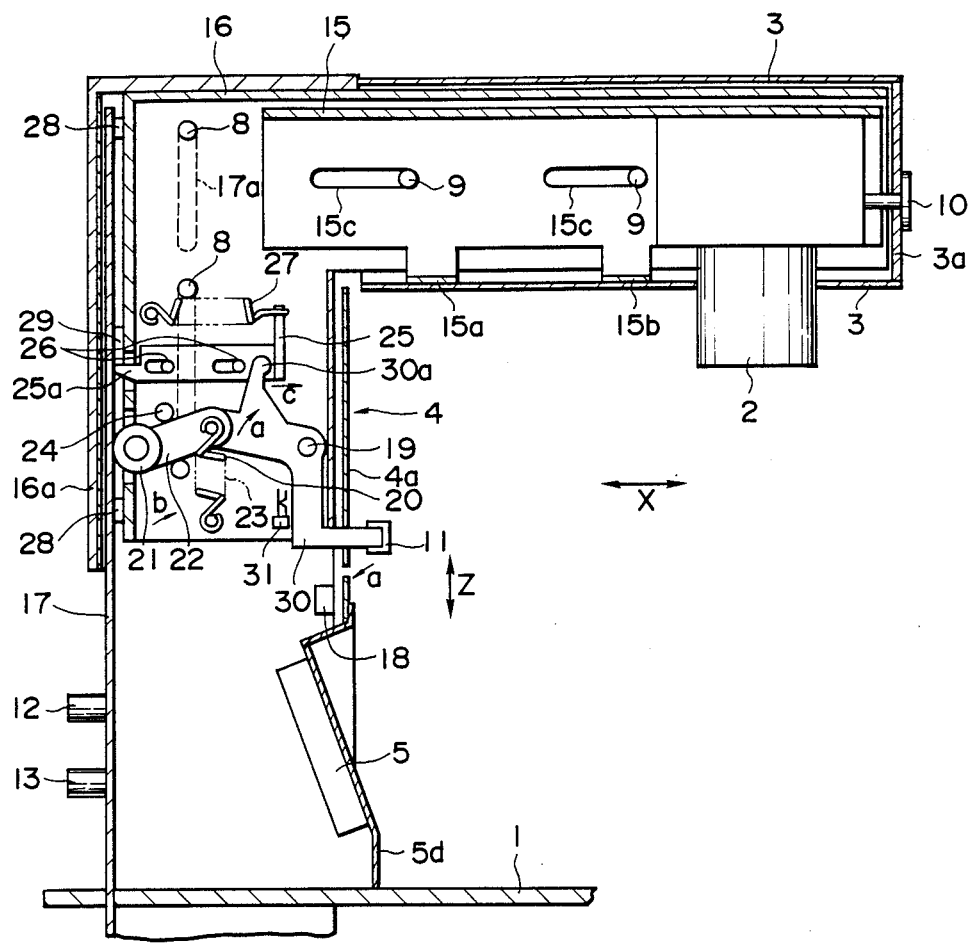
FIG. 5 is an enlarged cross-sectional view of a third embodiment of this invention taken along a line similar to the line A—A of FIG. 1.

FIG. 5 is a cross-sectional view of the third embodiment of this invention taken along the line similar to the line A—A of FIG. 1. In FIG. 5, reference numerals 15, 16 and 17 denote a slide table, an up-and-down moving stand and a fixed stand which fixes plate 1, respectively. In this embodiment, plate 1, camera 2 and monitor 5 are fixed as a unit by horizontal and vertical supporting members 3 and 4.

This structure is essentially the same as the referenced art and a duplicate description will not be repeated. A pair of pins 8 is fixed to moving stand 16, extends through guide grooves 17a in fixed stand 17 and is fixed to a cover 4a of vertical supporting member 4, as shown in FIG. 6, which is a cross-sectional view taken along the arrows X of FIG. 5.

Figure 6:
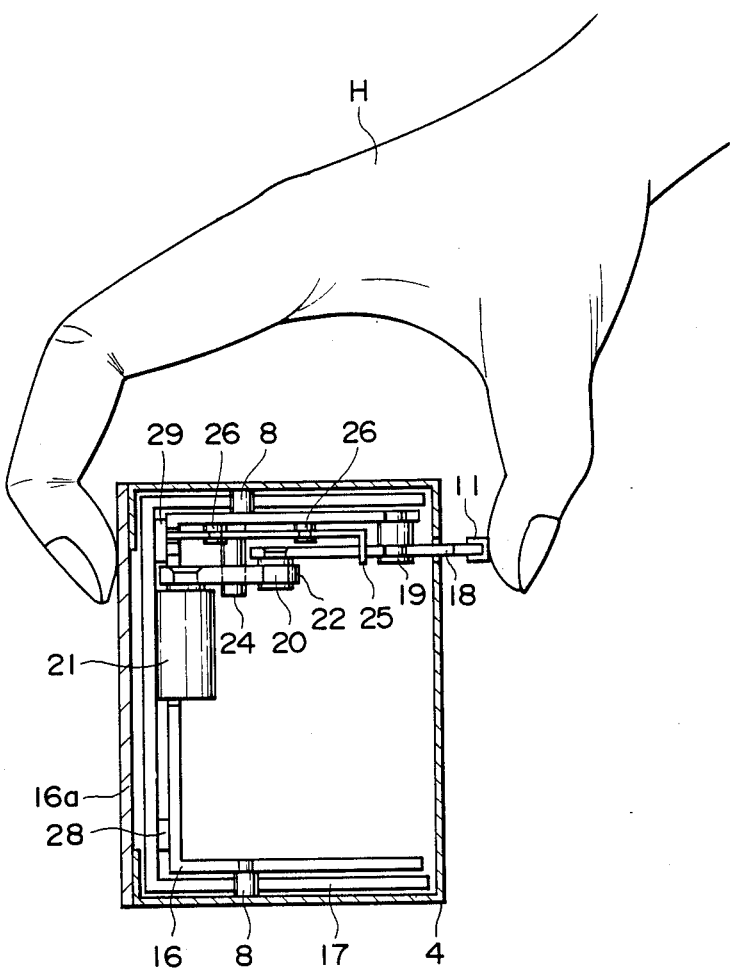
FIG. 6 is a cross-sectional view of the essential portion of FIG. 5 viewed in the direction of the arrow X.

In FIGS. 5 and 6, reference numeral 30 denotes a first lever which turns around a pin 19 fixed to moving stand 6 and has an operation knob 11 fixed at one end and a pin 20 fixed to the other end to which a second lever 22 is pivoted. Lever 22 has at one end a frictional member 21, for example, of rubber, fixed thereto and forced against fixed stand 17 to form a toggle mechanism between stands 16 and 17. A tension coil spring 23 is engaged at one end with pin 20 which forms an intersection of levers 30 and is 22, and biased to increase the toggle angle included between levers 30 and 22. Reference numeral 24 denotes a guide pin for lever 22 fixed to moving stand 16. A lock lever 25 is guided by a pair of pins 26 fixed to moving stand 16 so as to slide in the direction of the arrows X and has at one end a locking portion 25a which is locked in a member 29 fixed to the fixed stand 17. A tension coil spring 27 normally biases lock lever 25 toward member 29.

In this embodiment, member 29 is locked only when moving stand 16 has reached a bottom dead center. This is because the locking mechanism composed of levers 30 and 22 can lock stand 16 like a toggling mechanism when stand 16 moves downwardly while the locking mechanism cannot lock stand 16 as a result of the toggle angle included between levers 30 and 22 decreasing when moving stand 16 moves upwardly.

Consequently, the stand 16 is completely locked by the second locking mechanism which includes lever 25, member 29, etc., at the bottom dead center of moving stand 16. The reason why the stand 16 is completely locked only at its bottom dead center is that the practicality of stand 16 is considered. Namely, complete locking is not needed in the vertical movement of stand 16 for magnification zooming, etc., and complete locking is required when the apparatus is transported and/or housed. In these cases, moving stand 16 is usually held at its bottom dead center position, so that the apparatus is constructed so as to lock the stand 16 only at the bottom dead center position. The apparatus may be constructed such that complete locking is performed at a plurality of other predetermined positions as needed.

A spacer 28 is fixed to moving stand 16 so as to provide a spacing between moving stand 16 and fixed stand 17.

In FIGS. 5 and 6, reference numerals 18 and 31 denote a voice input unit including a microphone, and a detector switch, respectively.

Figure 7:
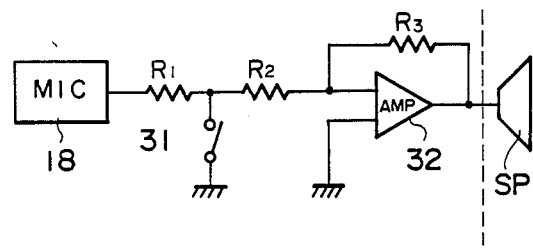
FIG. 7 is an electrical circuit diagram of a microphone section of the third embodiment.

FIG. 7 shows the electrical circuit of the microphone section. SP denotes an external speaker. Reference numeral 32 denotes an amplifier. R1–R4 denote resistors. The output signal from microphone 18 is amplified by amplifier 32 via resistors R1, R2 and delivered to external speaker SP. When the detector switch 31 between resistors R1 and R2 is off, the signal from microphone 18 is input to amplifier 32 while when the detector switch 31 is switched on, it is grounded and no signal from microphone 18 is transmitted to amplifier 32, so that the speaker SP produces no sound.

(Operation)

The electronic camera 2 is moved horizontally in the direction of the arrows X by the sliding of the pair of pins 9 fixed to moving stand 16 in the elongated grooves 15c in slide table 15. At this time, camera 2 is moved by moving cover 3a in the direction of the arrows X because cover 3a of horizontal supporting member 3 is fixed to slide table 15 by members 15a, 15b along with camera 2.

When camera 2 is to be moved vertically in the direction of the arrows X, a portion 16a of moving stand 16 and operation knob 11 are held, as shown in FIG. 6, and rotated in the direction of the arrow a (FIG. 5) by the thumb and other fingers of one hand H on the assumption that moving stand 16 is at its bottom dead center. By this operation, first lever 18 is turned and support point 20 is moved in the direction of the arrow a, so that second lever 22 is pulled by support point 20 so as to move in the direction of arrow b (FIG. 5) along guide 24. Thus frictional member 21 is moved out of contact with fixed stand 17. At the same time, a protrusion 30a of lever 30 pushes lock lever 25 in the direction of the arrow c (FIG. 5) to thereby unlock locking portion 25a from member 29. Thus moving stand 16 becomes free and simultaneously detector switch 31 is switched on.

Under these circumstances, moving stand 16 is moved upwardly by the cooperation of the respective pins 8 and guide grooves 17a. If stand portion 16a and operation knob 11 are released from hand, support point 20 is rotated in the direction opposite to the arrow a by the resiliency of spring 23, first lever 30 is returned to its initial position, and second lever 22 is moved along guide 24. Thus frictional member 21 is pushed against fixed stand 17 so that the frictional force prevents the moving stand 16 from falling. At the same time, detector switch 31 is switched off.

As described above, moving stand 16 and hence camera 2 can be moved vertically by a simple operation to perform zooming easily.

Moving stand 16 is then moved to its bottom dead center by the above operation. If stand portion 16a and knob 11 are then released from hand H, levers 30 and 22 perform the above operations and locking lever 25 is moved by spring 27 in the direction opposite to the arrow c to be engaged with member 29. This causes moving stand 16 to be completely locked, so that although large force or vibrations are applied to the apparatus when same is transported or housed, moving stand 16 is prevented from moving.

As described above, in this particular embodiment, when locking is released and camera 2 is moved vertically, detector switch 31 is switched on, so that the signal from microphone 18 is grounded by the circuit show in FIG. 7. Thus a null input is applied to amplifier 32 and speaker SP produces no sound. Thus mechanical noise due to locking and/or unlocking of some members and noise from sliding of some members are not produced from speaker SP.

In the locked state, detector switch 31 is off and the signal from the microphone 18 is amplified as it is and input to speaker SP. Thus a lecturer's voice is transmitted as it is along with his picture to the audience.

In the above embodiment, the timing of muting microphone 18 depends on change switch 31. A similar effect may be obtained by sensing the movement of the supporting member using a photosensor, a magnetic sensor or the like.

In a further application of this invention, noise due to the switching of video change switch 6a (FIG. 1) may be eliminated by interlock with switch 6a.

In order to allow release, in a simple operation by one hand, of the locking mechanism of the support member which supports the photoelectric conversion unit and continuous change of the position where the conversion unit is supported, the particular embodiment includes a zooming lock mechanism which includes levers 30, 22, etc., a complete lock mechanism which includes lock lever 25, member 29, etc., which locks moving stand 16 at the bottom dead center. The latter or complete lock mechanism for transportation and housing of the apparatus may be of the screw type. The reason for this is that the number of events of transportation and/or housing is relatively small, release of the locking members by simple operation is possible in actual use, and its operability is not damaged.

As described above, this embodiment is constructed so that the movement of the photoelectric conversion unit is detected, at which time the output from the voice input unit is grounded. Thus this embodiment has a simple-low-cost structure to cut off uncomfortable mechanical noise which would otherwise be produced at the transportation of the apparatus.

In addition, this embodiment has a very simple structure which includes two kinds of locking means for locking the photoelectric conversion unit at a desired position in a predetermined range of movements and for locking the photoelectric conversion unit at a specific position. Thus the reading magnification of the picture reading apparatus can be changed continuously by simple hand operation. Thus a less expensive, more reliable, higher-operability picture reading apparatus is provided which has high durability in transportation/housing.

(Fourth Embodiment)

A picture reading apparatus could be thought out which includes, for example, a rotatable camera having a photoelectric conversion unit to read a material not put on the document plate, for example, a picture on a blackboard on the wall, in addition to a material placed on the document plate. In a picture reading apparatus having such a function, however, a picture output to the monitor during movement of the camera would move grotesquely and very unseemly.

The fourth embodiment of this invention is intended to provide a simple structure picture reading apparatus which eliminates the above drawbacks and which is capable of, for example, interrupting or lowering the picture output to the monitor display so as not to be unseemly during rotation of the camera.

Figure 8:
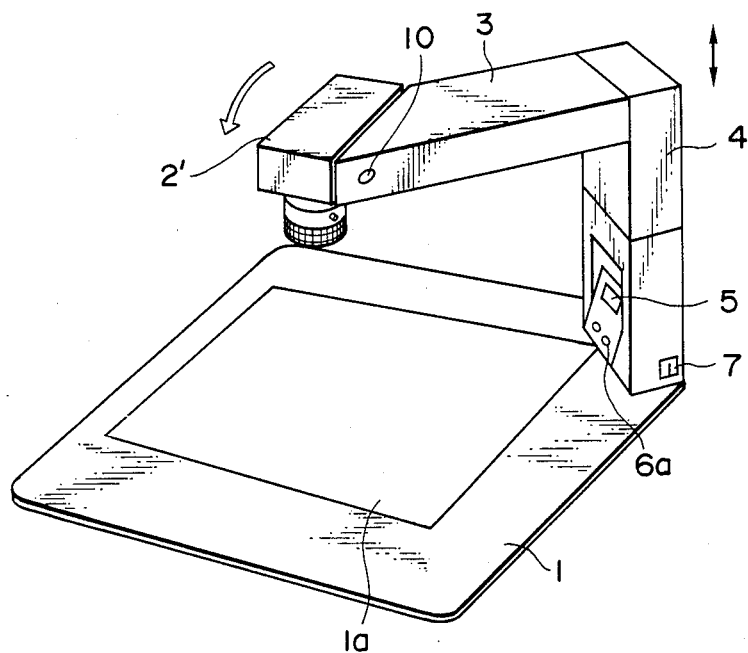
FIG. 8 is a perspective view showing one example of the structure of a picture reading apparatus of a fourth embodiment of this invention.
Figure 9:
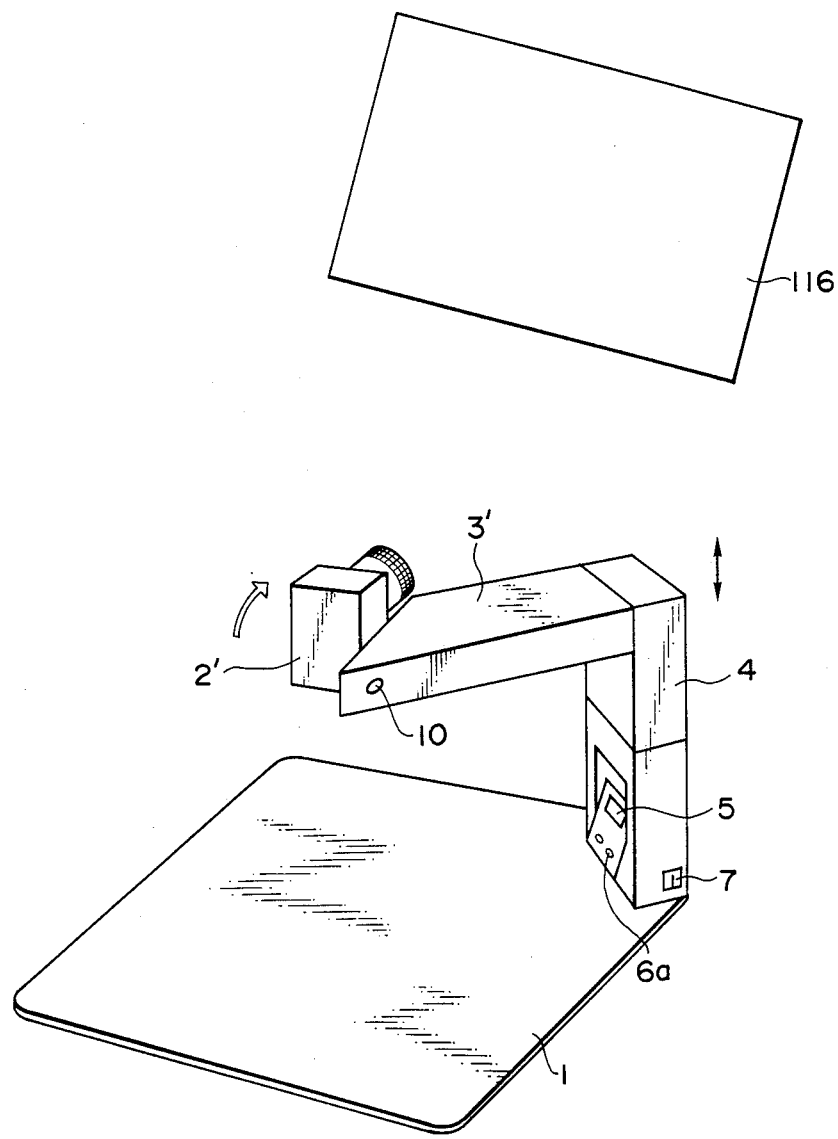
FIG. 9 is a perspective view showing the apparatus of FIG. 8 with the camera unit 2' turned.

FIGS. 8 and 9 are perspective views showing the structure of the fourth embodiment of this invention. In FIGS. 8, 9, the components having functions similar to those of the components of the previous embodiments are similarly numbered and no similar description will be repeated.

In FIGS. 8 and 9, camera unit 2' is disposed opposite to and above document plate 1. The camera unit is rotatably supported at horizontal supporting member 3' and can be rotated in the direction of the arrow. In this embodiment, the range of pickup or photographing area on plate 1 can be changed by moving camera unit 2' vertically by means of vertical supporting member 4.

Camera unit 2' is also turnable in the vertical plane, in the direction of the arrow, as shown in FIGS. 8 and 9, relative to horizontal supporting member 3'. For example, a picture on a blackboard 116 disposed at a position such as shown in FIG. 9 can be picked up by turning camera unit 2' so as to face the image.

Figure 10:
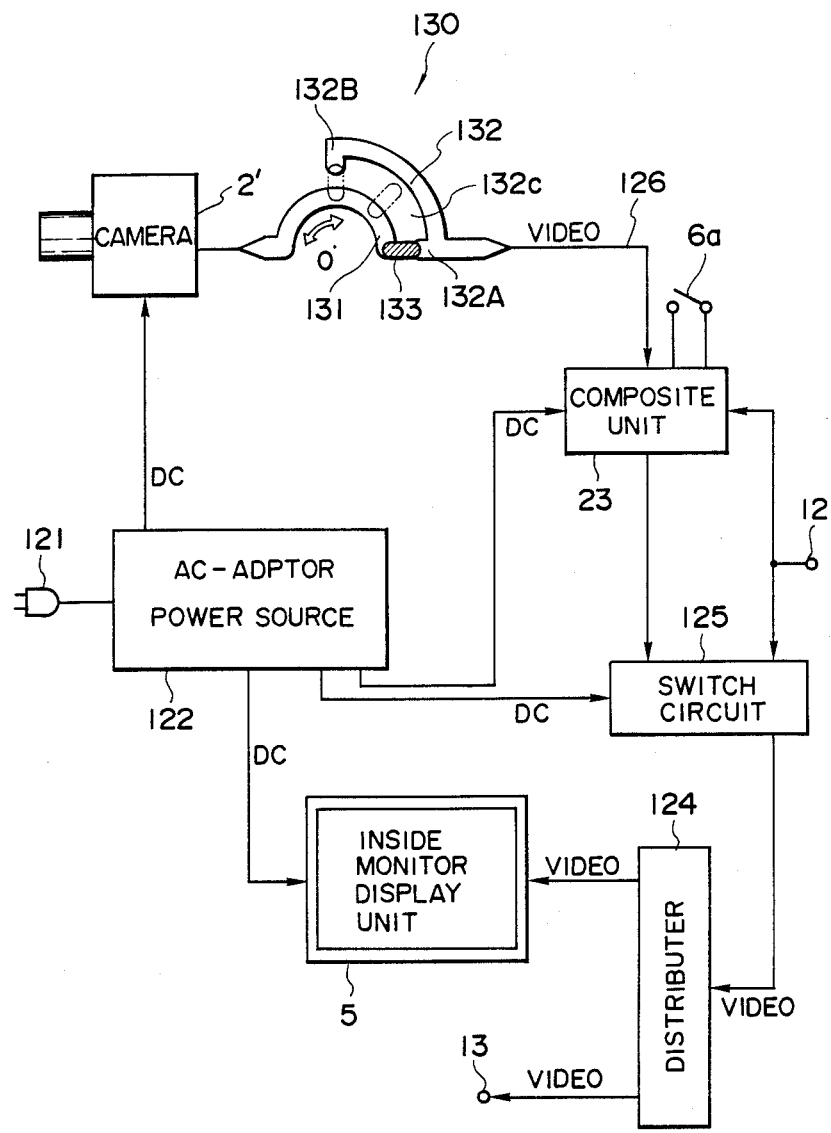
FIG. 10 illustrates the structure of a control circuit of a picture reading apparatus of a fourth embodiment of this invention.

FIG. 10 shows the structure of a control circuit of the apparatus of this embodiment. Reference numeral 121 denotes a power source plug. An AC adapter 122 is used to supply a DC power to camera unit 2', monitor display 5 and other components so that individual power sources are not needed. When mode change switch 6a is switched on, a synthesizer 123 synthesizes a picture, for example, on equal terms, from a video switch input from external input terminal 12 and a video output signal from camera unit 2', and outputs the result. It can also output only a video output signal from camera unit 2' by switching off switch 6a.

Reference numeral 124 denotes a distributor. When mode change switch 6a is switched off, a switching circuit 125 interrupts an external picture signal input from external input terminal 12 to stop feed to distributor 124. When mode change switch 6a is on and the external video signal is supplied from input terminal 12, distributor 124 distributes the video signal to monitor display 5 and external monitor output terminal 13.

In this embodiment, such control circuit includes a device 130 in the circuit of a picture output signal line 126 from camera unit 2' for lowering the level of the picture signal. In this embodiment, the picture signal level lowering device employs an interception unit which includes a switching mechanism having two connection positions. A rotary terminal chip 131 turns around a center O in response to the turning of camera unit 2'. An arcuate fixed terminal chip 132 is disposed opposite to rotary chip 131.

Now assume that camera unit 2' faces an original document 1a on plate 1, as shown in FIG. 8, and outputs its picture as a video signal, a connection member 133 of rotary terminal chip 131 is put into contact with, for example, a first contact 132A of fixed terminal chip 132. Under these circumstances, when camera unit 2' proceeds to its turning operation, rotary terminal chip 131 responds by which connection member 133 of chip 131 moves to a non-contact position where member 133 does not contact fixed terminal chip 132, namely, to a non-contact position 132C between first and second contacts 132A and 132B of fixed terminal chip 132, at which position the video output signal Video from camera unit 2' is interrupted and a zero-level video signal is output.

When the turning of camera unit 2' then ends and camera unit 2' faces blackboard 116 as shown in FIG. 9, rotary terminal chip 131 is turned. Thus connection member 133 of rotary terminal chip 131 in turn contacts second contact 132B of fixed terminal chip 132, and the output signal Video from camera 2' is again supplied to monitor display 5. As described above, during turning of camera unit 2', no video signal is output to display 5, so that a useless unseemly picture occurring during movement of the camera is interrupted from the user.

In the above, the video output signal from camera unit 2' has been described as being intercepted by interception unit 130. Alternatively, such an interception unit may be provided, for example, between AC adapter 122 and camera unit 2', or an attenuator, for example, may be provided instead of the interception unit which attenuator operates simultaneously with the movement of camera unit 2' to lower the level of the picture output signal to below a predetermined level so as to prevent the video output signal from being displayed by monitor display 6 during movement of camera unit 2'. Furthermore, during movement of camera unit 2', a picture output, for example, of characters for other displays instead of the video output signal from camera unit 2' may be supplied to monitor display 5. Also, a timer switch may be provided to stop supply of the video output signal for a predetermined time at the same time with the turning of the camera. Even if the video output signal is displayed at the monitor display during movement of camera 2', the front of display 5 may be shielded, for example, by a liquid crystal shutter, during movement of camera unit 2' to prevent display of an unseemly picture at display 5 during movement of the camera.

While in the above embodiment there are two stop positions where the turning of camera unit 2' is stopped to pick up the image; the position where the camera faces the document plate 1 and the position where the camera faces the blackboard on the side. This invention is not limited to these positions. This invention is also applicable to a device which picks up images at three or more positions.

Similarly, an unseemly display may be prevented, for example, even during vertical or other movements of the camera unit as in the particular embodiments.

As described above, according to this embodiment, during turning of the camera, the video output signal from the camera photoelectric conversion unit is not supplied at its normal level to the monitor display, so that a useless, unseemly picture picked up by the camera during turning of the camera is erased or suppressed to give no offense to the user.

In the picture reading apparatus shown in FIG. 1 the camera input unit and the support member are disposed perpendicular to a plane of documents placed on the plate 1. In this arrangement, the picture of a broad document appears on the entire screen of the monitor. Therefore, if a long document is displayed at the monitor, for example, only a central portion of the document is displayed and other portions cannot be monitored. If the document is slid back and forth in order to display at the monitor those portions except for the central portion, it is necessary to prevent interference of the leading end of the document with the vertical supporting member. This would increase the distance between the camera and the vertical support and reduce the strength of the mechanism. Alternatively, if a structure is employed in which the camera unit can be slid back and forth instead of the document, it would become complicated and the cost would increase. Furthermore, when the operator operates the mode change switch, the operator's hands would be displayed unseemly at the monitor. The monitor itself may appear unseemly when viewed at its front.

Figure 11:
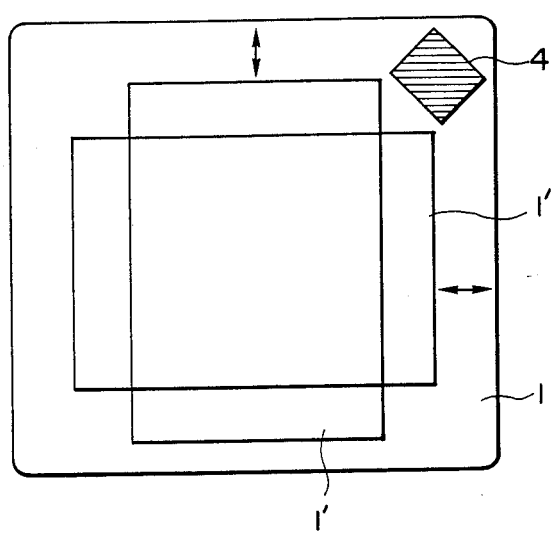
FIG. 11 is a plan view of the fourth embodiment with the horizontal support removed.

According to this embodiment, vertical supporting member 4 is disposed, as shown in a plan view in FIG. 11. Therefore, even if a broad document 1a is slid right and left, it would not interfere with vertical supporting member 4. Furthermore, if a long document 1b is moved back and forth, similarly no interference occurs. This arrangement allows horizontal supporting member 3 to be shortened. In this case, even if the length of the horizontal supporting member 3 is shortened, the document may be moved freely for that quantity back and forth and left and right, so that there is no problem in use. Especially, in an apparatus of this type, it is desirable that deviations of the ends of horizontal and vertical supporting members 3 and 4 (the camera is fixed to the end of horizontal supporting member 3) are small and that the apparatus is small-sized, light and is easy to transport when used in lecture, discourse or the like. When a load including the weights of the camera, the photoelectric conversion unit or the like acts on the end of horizontal supporting member 3 as a cantilever, the end deviation increases in proportion to the third power of the distance between the horizontal and vertical supporting members 3 and 4, so that it will be understood to be advantageous that horizontal supporting member 3 can be shortened. The end of vertical supporting member 4 is deviated in proportion to the third power of the height of vertical supporting member 4 because the moment due to the load acts on the end of the vertical supporting member 4 to which horizontal supporting member 3 is connected. Thus it would be necessary to increase the entire size and weight of both supporting members 4 and 5 in order to consider the strength of the vertical and horizontal supporting members in their own ways to suppress the deviation. However, according to this embodiment, the horizontal supporting member 4 can be shortened, so that a lighter, less expensive apparatus can be provided which occupies a reduced space, and has an improved performance.

As described above, according to this embodiment, horizontal and vertical supporting members 3 and 4 are disposed slanted to camera unit 2', so that even if a long or broad document is slid back and forth and right and left, it can avoid interference with vertical supporting member 4. Further, since the distance between camera unit 2' and vertical supporting member 4 can be set short, the strength of horizontal supporting member 3, etc., may be sufficiently assured. While in this embodiment the vertical supporting member has been shown as being provided at the upper right corner as shown in FIG. 11, this invention is not limited to this. For example, it may be provided at one of other corners or inwardly from that corner.

The apparatus having the following advantages is thus provided. When the document may touch the vertical supporting member when for example, the length of the vertical supporting member is adjusted or mode change switch 6a, etc., are operated, the operator's hand is not displayed on the monitor, so that the display does not give an unseemly display. Further, the picture reading apparatus provides an easy-to-see built-in monitor 5, occupies a reduced space, is lighter, less expensive and is easy to use and transport.

As described above, according to the fourth embodiment of this invention, in addition to the above-mentioned advantage, the following advantageous are provided. By the disposition where the supporting means is slanted to the reading means, the distance between the camera input unit and the vertical supporting member is reduced, the entire strength is increased, the vertical supporting member does not interfere with an original document, broad or long, even if the document is slid right and left and back and forth, the operator's hand will not be displayed on the monitor, the monitor is easy to see, and the operability of the apparatus is increased.

We claim:

1. A picture reading apparatus comprising:
   photoelectric conversion means for converting an image of an object to an electric signal;
   support means for movably supporting said photoelectric conversion means;
   voice input means for inputting a voice signal; and
   control means for reducing an output from said voice input means when said support means is moved.

2. A picture reading apparatus of claim 1, further comprising means for detecting whether or not said support means is movable.

3. A picture reading apparatus of claim 1, wherein said control means includes mean for virtually nullifying the output from said voice input means.

4. A picture reading apparatus of claim 1, wherein said voice input means is supported by said support means.

5. A picture reading apparatus of claim 1, wherein said support means includes a locking mechanism for limiting the movement of said photoelectric conversion means.

6. A picture reading apparatus of claim 5, further comprising means for detecting the unlocked state of said locking mechanism, and wherein said control means includes means for reducing the output from said voice input means in response to the detection of said unlocked state by said detecting means.

7. A picture reading apparatus comprising:
an object plate on which an object to be read is placed;
photoelectric conversion means, supported by a supporting member including a support section connected to said object plate, for converting an image of said object to an electric signal, said support section being extendable;
first lock means for setting said support section continuously at any position in an extension thereof;
second lock means for fixing said support section at a predetermined position; and
unlock means for unlocking said first and second lock means simultaneously using a single operation member.

8. A picture reading apparatus of claim 7, wherein said support section includes:
(a) a fixed stand fixed to said object plate; and
(b) a movable stand movable relative to said fixed stand.

9. A picture reading apparatus of claim 8, wherein said first lock means includes an engagement member provided between said fixed and movable stands.

10. A picture reading apparatus of claim 8, wherein said predetermined position where said support section is locked by said second lock means includes a bottom dead center of said movable stand.

* * * * *

UNITED STATES PATENT AND TRADEMARK OFFICE
CERTIFICATE OF CORRECTION

PATENT NO. : 4,831,455

DATED : May 16, 1989

INVENTOR(S) : Tadashi Ishikawa, et al.

It is certified that error appears in the above-identified patent and that said Letters Patent is hereby corrected as shown below:

COLUMN 1:

Line 22, delete "prior art".

Line 68, change "signal," to --signal, and--.

COLUMN 2:

Line 1, delete "of".

Line 51, change "described 0" to --described on--.

COLUMN 4:

Line 31, change "tee" to --the--.

UNITED STATES PATENT AND TRADEMARK OFFICE
CERTIFICATE OF CORRECTION

PATENT NO. : 4,831,455
DATED : May 16, 1989
INVENTOR(S) : Tadashi Ishikawa, et al Page 2 of 2

It is certified that error appears in the above-identified patent and that said Letters Patent is hereby corrected as shown below:

COLUMN 5:

Line 5, change "6" to --16--.

COLUMN 6:

Line 22, after "hand" insert --the--.

COLUMN 10:

Line 43, change "advantage" to --advantages--.
change "advantageous" to --advantage--.

Signed and Sealed this

Twenty-first Day of November, 1989

Attest:

JEFFREY M. SAMUELS

Attesting Officer    Acting Commissioner of Patents and Trademarks